United States Patent
Bolt et al.

(10) Patent No.: US 7,471,780 B2
(45) Date of Patent: Dec. 30, 2008

(54) CONFIGURABLE PROFILING OF DATA

(75) Inventors: George Bolt, Hampshire (GB); John Manslow, Hampshire (GB)

(73) Assignee: Cerebrus Solutions Limited, Harlow (GB)

( * ) Notice: Subject to any disclaimer, the term of this patent is extended or adjusted under 35 U.S.C. 154(b) by 516 days.

(21) Appl. No.: 10/509,600

(22) PCT Filed: Mar. 28, 2003

(86) PCT No.: PCT/AU03/00383

§ 371 (c)(1),
(2), (4) Date: Jan. 23, 2005

(87) PCT Pub. No.: WO03/083697

PCT Pub. Date: Oct. 9, 2003

(65) Prior Publication Data

US 2005/0246182 A1    Nov. 3, 2005

(30) Foreign Application Priority Data

Mar. 28, 2002   (GB) ................... 02073922

(51) Int. Cl.
*H04M 15/00* (2006.01)
*H04M 17/00* (2006.01)
*H04M 3/00* (2006.01)
*H04M 1/66* (2006.01)

(52) U.S. Cl. ............... 379/114.14; 379/145; 379/189; 455/410

(58) Field of Classification Search ............ 379/114.14, 379/133, 145, 188, 189, 196; 455/410
See application file for complete search history.

(56) References Cited

U.S. PATENT DOCUMENTS

| 5,627,886 | A | * | 5/1997 | Bowman ............... 379/145 |
| 5,907,602 | A | | 5/1999 | Peel et al. |
| 5,966,650 | A | | 10/1999 | Hobson et al. |
| 6,307,926 | B1 | | 10/2001 | Barton et al. |
| 6,327,352 | B1 | | 12/2001 | Betts et al. |
| 6,526,389 | B1 | | 2/2003 | Murad et al. |
| 6,601,048 | B1 | | 7/2003 | Gavan et al. |
| 6,732,082 | B1 | | 5/2004 | Gavan et al. |

(Continued)

FOREIGN PATENT DOCUMENTS

WO    WO 97/03533 A    1/1997

(Continued)

OTHER PUBLICATIONS

Supplementary European Search Report by The European Patent Office on Aug. 3, 2006.

*Primary Examiner*—Quoc D Tran
(74) *Attorney, Agent, or Firm*—Knobbe, Martens, Olson & Bear LLP

(57) ABSTRACT

In one embodiment, a method of configurably profiling data uses system comprising a pre-processor, a profiler, a post-processor and database. The pre-processor receives data and feedback data and performs configurable first calculations thereon to create data relating to profiling features. The profiler summarizes the profiling features data over a length of time by performing configurable second calculations thereon to create summarized data relating to profiled features. The post-processor performs configurable third calculations the profiled features data to create the feedback data and a profiled output data stream for further processing.

49 Claims, 2 Drawing Sheets

U.S. PATENT DOCUMENTS

| | | | |
|---|---|---|---|
| 6,801,606 B1 * | 10/2004 | Edwards | 379/114.14 |
| 6,850,606 B2 * | 2/2005 | Lawyer et al. | 379/114.14 |
| 2002/0184080 A1 | 12/2002 | Murad et al. | |

FOREIGN PATENT DOCUMENTS

| | | |
|---|---|---|
| WO | WO 97/37486 A1 | 10/1997 |
| WO | WO 99/13427 A | 3/1999 |
| WO | WO 00/64193 A | 10/2000 |
| WO | WO 00/67460 A | 11/2000 |
| WO | WO 01/41469 A2 | 6/2001 |

* cited by examiner

CONFIGURABLE PROFILING OF DATA

FIELD OF THE INVENTION

The present invention relates to configurable profiling of data. In particular the present invention relates to configurable profiling of data to identify a sought after event. The sought after event may be an instance of fraudulent activity on a telephone system, however the present invention has application in other high data volume environments to identify other sought after events.

BACKGROUND TO THE INVENTION

Fraud is a serious problem in modern telecommunications systems, and can result in revenue loss by the telecommunications service provider, reduced operational efficiency, and increased subscriber churn. In the highly competitive telecommunications sector, any provider that can reduce the revenue loss resulting from fraud—either by its prevention or early detection—has a significant advantage over its competitors.

Differences in networks and services exist not only on an international level, but also between operators in individual countries. For example, different operators may specialise in only mobile or landline services, each of which have unique fraud characteristics, and thus require different fraud detection engines. Similarly, different countries may have different standards for the B-number (destination number) partitions that distinguish different types of services, thus requiring modifications to B-number sensitive components of a fraud detection engine.

For example, telephone networks in the UK prefix the numbers of premium rate services with 0898 and free phone services with 0800. Most fraud detection systems in operation in the UK therefore consider high volumes of calls to numbers starting with 0898 to be more suspicious than to numbers starting with 0800 because the high cost of calls to premium rate services makes them an attractive target for fraudsters. If UK-based fraud detection engines are transferred to other countries, they will need to be modified to account for the fact that the prefixes that indicate premium rate and free phone services are different.

The patterns that characterise fraudulent behavior also change with time, not least in response to a telecommunication company's attempts at detection and prevention. A fraud detection system therefore needs to be highly configurable so that it can easily be adapted to the requirements of different networks and operators, and to incorporate information about new types of fraud as they emerge. Such configuration must be possible without modification to the fraud detection software, as the development, testing, and validation processes are too expensive and time consuming to be repeated often enough to keep fraudsters in check.

Most fraud detection systems identify fraud by building profiles of the behavior of particular entities in a network based on a pre-defined, hard coded set of features, such as average call duration, or the percentage of calls to international numbers, which are measured over fixed or variable time periods (see, for example, WO/0141469). Such systems cannot be modified to detect new fraud types, or to operate in environments where the pre-defined feature set is not effective without software modifications.

SUMMARY OF THE PRESENT INVENTION

One aspect of the invention provides a system for constructing and processing behavioral profiles that are well suited to fraud detection that is highly flexible, and can be configured without requiring changes to the underlying software engine.

According to a first aspect of the present invention there is provided a method of configurably profiling data comprising the steps of:
  receiving data from an input data stream;
  pre-processing the received data by performing configurable first calculations thereon to create data relating to profiling features;
  summarizing the profiling features data over a length of time by performing configurable second calculations thereon to create summarized data relating to profiled features; and
  post processing the profiled features data by performing configurable third calculations thereon to create a profiled output data stream for further processing.

Preferably the pre-processing stage includes receiving feedback data, which is used in the first calculations to create the data relating to profiling features, wherein the post-processing stage creates the feedback data from the third calculations.

According to a second aspect of the present invention there is provided a configurable data profiling system comprising at least:
  a pre-processor arranged to receive an input data stream, the pre-processor also configured to perform configurable first calculations on the input data to create data relating to profiling features;
  a profiler configured to summarize the profiling features data over a length of time according to configurable second calculations to create summarized data relating to profiled features; and
  a post-processor configured to perform configurable third calculations on the profiled features data to create profiled output data for further processing.

Preferably the pre-processor is arranged to receive feedback data and perform the first calculations on the input and feedback to create the data relating to profiling features, wherein the post-processor is configured to perform configurable third calculations on the profiled features data to create the feedback data and the profiled output data, wherein the system further comprises a means for providing the feedback data to the pre-processor.

Preferably the first calculations comprise applying a linear calculation to one or more sub-streams of the data. Preferably the linear calculation does not alter the data.

Preferably intermediate results of the first calculations are temporarily stored for use in further first calculations.

Preferably each profiling feature is reconfigurably flagged as changed or unchanged to indicate whether or not the input data stream has changed from a previous input.

Preferably the behaviors of the profiling features data are summarized over a number of non-overlapping time slots of configurable length. Preferably profiling features data independent of start and end times of events are stored in a scratch pad memory.

Preferably the profiling features data is stored in one of the slots that corresponds with when an event that caused the profile to be updated started or ended. Alternatively the profiling features data is stored in every slot during which the event was in progress. Preferably each new instance of data falling within a time slot overwrites data already in that time slot. Alternatively the data in the time slots is accumulated.

Preferably the time slots are configured to wrap, such that if an update to the profiling features goes beyond the end of the last (most recent) slot, it wraps around to the first (oldest) slot and overwrites the data and creates an event message.

Preferably an event message is created when the profiler receives its first input.

Preferably the second calculations include using event messages to trigger specified rules. Alternatively event messages form part of the data relating to profiled features for post-processing.

Preferably the data relating to profiled features comprises information in the time slots and scratch pad memory.

Preferably the third calculations include identifying potential indicators of the event sought. Preferably the third calculations include preparing the output data stream for further processing to identify indicators of the event sought.

Preferably intermediate results of the third calculations are temporarily stored for use in further third calculations.

Preferably each output data feature is reconfigurably flagged as changed or unchanged to indicate whether the profiled data stream has changed from a previous input or not.

Preferably the data is profiled to detect possible instances of fraud.

According to a third aspect of the present invention there is provided a method of fraud detection comprising the step of configurably profiling data as defined above.

According to a fourth aspect of the present invention there is provided a fraud detection system comprising a configurable data profiling system as defined above.

BRIEF DESCRIPTION OF THE DRAWINGS

In order provide a better understanding of the prevent invention, preferred embodiments will now be described in greater detail, by way of example only, with reference to the accompanying drawings, in which.

DETAILED DESCRIPTION OF PREFERRED EMBODIMENTS

Figure 1:
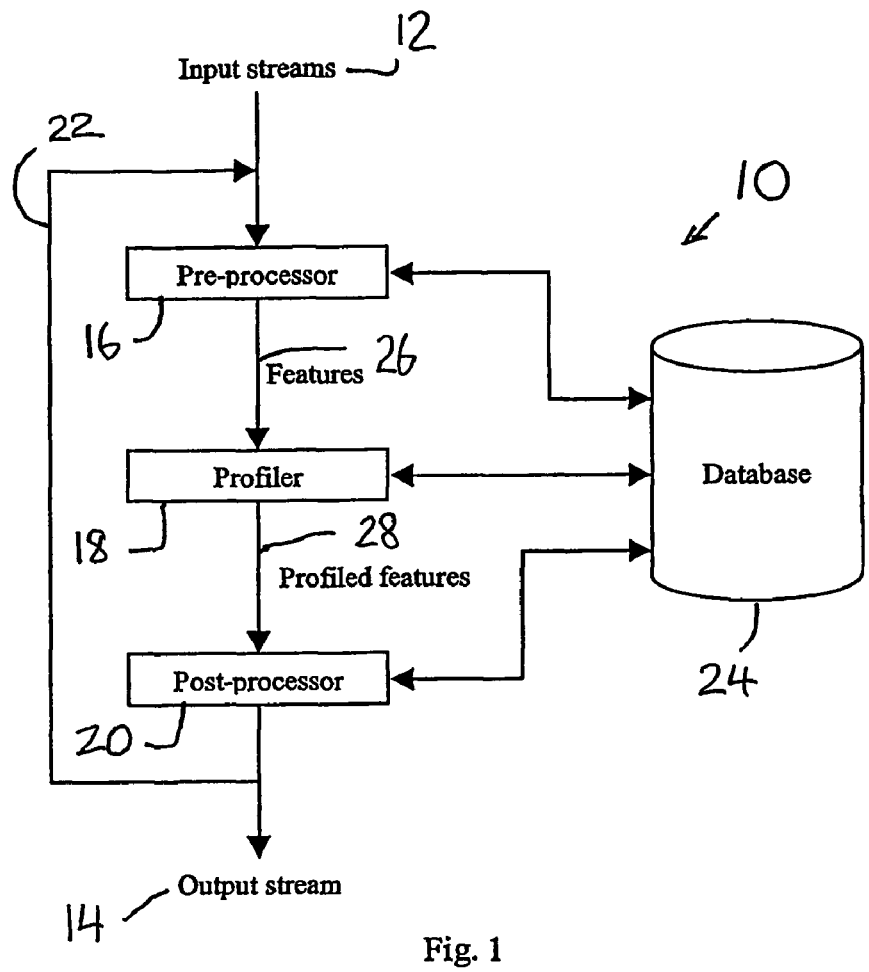
FIG. 1 is a schematic representation of a preferred embodiment of a system for profiling data according to the present invention.

Referring to FIG. 1, there is shown a system 10 that receives a data stream 12 (including one or more sub-streams) and outputs a data stream 14 (also including one or more data sub-streams). The system 10 includes a pre-processor 16, a profiler 18, a post-processor 20 and a database 24. The pre-processor 16, profiler 18 and post-processor 20 can each assess the database 24 and can each write to the database 24 to obtain or save long term information.

In the present example the system 10 is configured to identify suspicious telephone activity that may indicate fraud. Due to the high volume of telephone call data required to be processed each of the pre-processor 16, profiler 18, and post-processor 20 stages attempts to reduce the volume of data that is processed by the subsequent stages so that progressively more (usually more computationally intensive) analysis can be conducted. The system is preferably event driven, with each subsequent stage only performing processing when changes occur in its inputs.

The system 10 may be implemented in the form of a computer or network of computers programmed to perform each of the stages of processing of the data. For example a single computer could be programmed to run the system 10 or a dedicated computer may be programmed to run each of the components of the system 10.

To allow for the system 10 to accommodate changes in fraudulent behavior and to allow the system 10 to be applied in different network environments the configuration of each of the pre-processor 16, profiler 18, and post-processor 20 stages can be initially and subsequently reconfigured during runtime. The configuration of the components of the system 10 may be conducted by input through a graphical user interface (GUI), uploading a configuration file, or receiving a configuration data stream.

The pre-processor 16 receives information from the data stream 22 (which can, for example, contain information from event data records (EDRs, which are generated whenever a telephone call is made and contain details of the number that was dialled, the call's cost, etc.), customer and business data, or feedback information 22 output by the post-processing module 20).

The input data stream 22 can contain multiple sub-streams, the contents of which can be unrelated and can change in unrelated ways. For example, a data stream may contain a customer data sub-stream, and an EDR sub-stream. The contents of the customer data sub-stream would only change when customer details change (for example, due to a change of address), while the contents of the EDR sub-stream would change with every call.

The pre-processor 16 can perform a mixture of runtime-configurable linear and non-linear calculations or transformations of its inputs. These calculations can comprise mathematical and logical functions and rules on textual, numeric, etc. data, which have access to external databases 24. The results of these transformations are called 'features' and each consists of a numeric scalar or a string. For example, a list of 'hot' destinations (numbers that are frequently called by fraudsters) can be stored in an external database 24. A feature can then be created that indicates whether an EDR represents a call to one of the listed numbers by assigning to it a value of one if the B-number in the EDR matches one of the listed hot destinations, and zero otherwise.

The pre-processor 16 may create intermediate variables, which persist only while it is active, and can be used to store the intermediate results of calculations. This important feature improves the efficiency by allowing results which may be common to several functions within the module to be calculated once and used many times.

Different functions can be applied to each input sub-stream of the input stream 12. Linear functions can be used to allow information to pass through the pre-processor 16 unchanged. The pre-processor 16 outputs features 26 that are used to construct a profile by the profiler 18. Each feature 26 can be flagged as changed or unchanged by the pre-processor 16 according to the pre-processor's configuration. The profiler 18 will only be updated if at least one of the features 26 is flagged as changed. This improves the efficiency of the invention because the pre-processor configuration can prevent the entire system being updated if changes in its input 22 are not considered significant by marking all features as unchanged.

Figure 2:
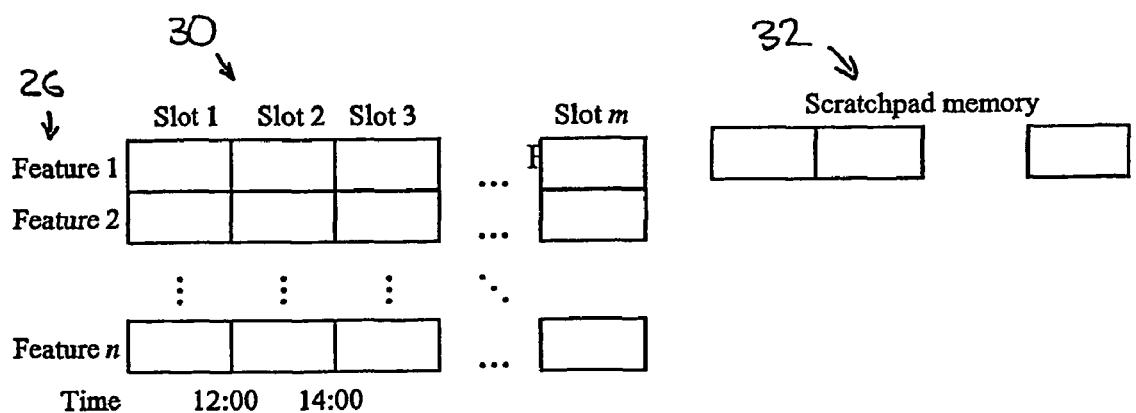
FIG. 2 is schematic representation of calculations conducted by a profiler of the system of FIG. 1.

The profiler 18 summarizes the behavior of each feature 26 over a time window to produce data relating to profiled features 28. The operation of the profiler 18 is described in more detail with reference to FIG. 2.

The behavior of each feature 26 is profiled over the period of time by dividing the period into a number of non-overlapping time slots 30 of configurable length. In this example each time slot is two hours.

The profiler 18 can be configured to receive a set of features 26 and enter them in a variety of ways. In a first configuration, the feature information may be stored in the slot during which the event that caused the profile to be updated started or ended. Alternatively, the feature information may be stored in every slot during which the event was in progress. If the selected update mechanism goes beyond the end of the last (most recent) slot in the time window, it "wraps around" to the first (oldest) slot and overwrites the information within it. Event messages are generated by the profiler 18 whenever significant events (such as the time window wrapping around, or the module receiving its first input) occur within it. These messages can be used to trigger specific rules, or can be passed to the post processor 20.

When entering new information into time slots, the profiler 18 can be configured so that it either overwrites data already present in the selected slot(s) 30, or is added to it.

In addition to the slot-based time window, the profiler 18 also contains an area of scratchpad memory 32 for the general storage of quantities in a way that is independent of the start and end times of the events with which they are associated. Sections of the scratchpad memory can be designated as volatile, which means that they only exist while the system is active, and are not stored in the application database 24 with the rest of the profile. They provide temporary storage within the system, and can be used to transfer data from the pre-processor 16 to the post-processor 20 unchanged, effectively bypassing the profiler 20.

The post-processor 20 is similar to the pre-processor 16, except that it operates on the profiled feature information 28, which comprises the information in the time slots 30 and the contents of the scratchpad memory 32. The post-processor 20 can perform a mixture of runtime-configurable linear and non-linear calculations or transformations of its inputs. These calculations can consist of mathematical and logical functions and rules, which have access to the external database 24.

The post-processor 20 processes information in the profiler 18 to produce feedback data 22. The feedback data 22 is fed back to the pre-processor 16. The post-processor 20 also processes information to produce the output stream 14 for presentation to other components in a greater fraud detection system. The post-processor 20 also performs some fraud detection directly. The direct fraud detection can be achieved by configuring rules to, for example, search for suspicious characteristics within the profiled features 28.

The output of the entire profiling system 14 thus consists of post-processed profiling information, and, potentially, fraud indications. Post-processed profiling information is typically sent to a rule base, scorecard, or change detection algorithm, in order to identify suspicious behavior. Fraud indications are typically sent to another layer of processing for further analysis. Like the pre-processor 16, each output of the post-processor 20 can individually be flagged as changed or unchanged according to the post-processor's configuration. This allows the invention to be used within a larger event-driven system, and to cause updates to it to be triggered only when significant events occur.

The feedback loop, created by feeding back feedback data 22 from the post-processor 20 to the pre-processor 16, allows information in the profile to be changed in almost any way. For example, information in a time slot can effectively be multiplied by new information by taking the logarithm of the new information in the pre-processor 16, adding it to the contents of the selected slot(s) and forming the exponential of the slot contents in the post-processing module 20.

The use of changes/unchanged flags in each of the stages is useful. For example, the profiler 18 could be configured to rate telephone calls according to the risk of them being part of a fraud. This could be done using a set of rules such as:

IF call_type IS local THEN risk IS low
IF call_type IS national AND call_duration<3600 seconds THEN risk IS low
IF call_type IS national AND call_duration>3599 seconds THEN risk IS medium If the post-processor 20 simply passed this risk information into the output stream 14, the output of the system would not be changed by the second of a contiguous pair of calls to local destinations. The pre-processor 16 can be configured to detect the second of such a pair and mark its outputs as unchanged so that redundant processing in the profiler 18 and post-processor 20 can be avoided. For example, the following rule could be used to mark the pre-processor 16 features output 26 as changed or unchanged as appropriate:

If call_type IS local AND previous_call_type IS local THEN mark_features_unchanged
ELSE mark_features_changed Since the majority of telephone calls are to local destinations, this rule would frequently prevent the activation of the profiler 18 and post-processor 20, thereby reducing the computational demands of the system and improving its throughput.

Figure 3:
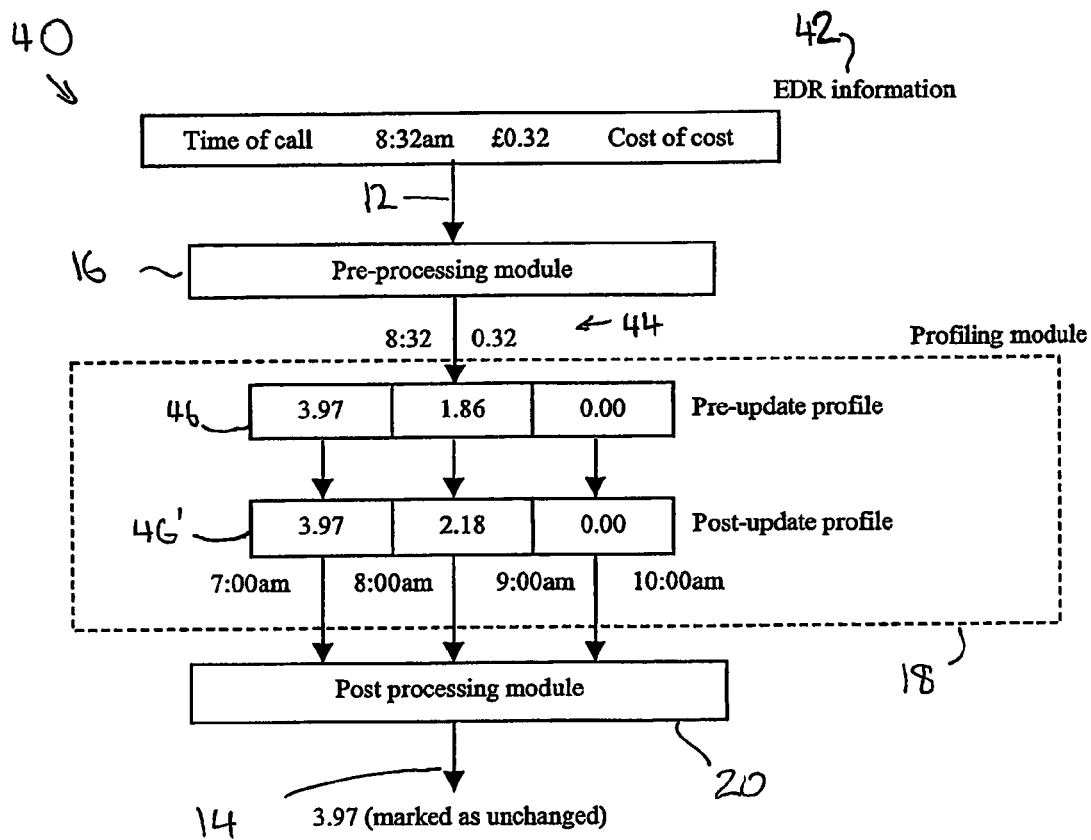
FIG. 3 is a schematic representation exemplifying profiling of data using the system of FIG. 1.

A simple example of how the system 10 could be applied in practice is shown in FIG. 3. In this example, the system 10 is configured to calculate the total cost of calls made within one hour periods. Note that there are numerous alternative ways of using the present system for this purpose, all of which create a unique instance of the system 40 for each telephone on a network. Whenever a call is made, an EDR 42 is generated within the telecommunications network, and passed to the instance of the system 40 dedicated to the telephone from which the call originated. The call cost information—which is usually contained in the EDR 42—can be passed through the pre-processor 16 to the profiler 18 module unchanged, creating a numeric feature with a value equal to the cost of the current call 44. (If call cost information was not available in the EDR, the pre-processor 16 could be configured to calculate call cost estimates using a series of rules and equations, based on information on the duration of a call, the destination number, and a lookup table of call charges stored in the database 24.) The pre-processor 16 would be configured to flag the call cost feature 44 as changed every time a new EDR 42 arrives to ensure that the profiler 18 is updated for every call.

The call cost feature 44 can be used in several ways. In this example, it is simply accumulated within the profiler time slots 46 corresponding to the call start times to form a measure of the total cost of all calls made by the user that were started within each slot. (The slots before profile update are numbered 46 and after update are numbered 46'). In more sophisticated embodiments, recursive estimates of summary statistics of call cost (such as its mean and variance) can be formed in the scratchpad storage 32 by appropriately formulated rules in the preprocessor 16. The post-processor 20 is, in this example, configured to output the contents of the first profiler slot earlier than that updated by the current call that contained at least one call, and to mark that output as changed only if the current call was the first in a new slot. For example, in FIG. 3, the call occurs at 8:32am, which falls in the second slot, so the contents of the first slot—in this case 3.97—will be output by the post-processor 20. This output will only be marked as changed if the current call is the first one to fall within the second slot. Since, in FIG. 3, several calls have already been recorded in the second slot, the post-processor's output 14 will be marked as unchanged. More complex configurations to the calculations performed by post-processor 20 are also possible, so that it can, for example, contain rules that generate alerts if the total call cost within an individual timeslot exceeds a predefined threshold, or if the cost of an individual call exceeds some function of estimated means and variances of the call costs. In the latter example, individual call costs can be passed to the post-processor 20 using volatile scratchpad storage 32.

Generally, the runtime configurability of the system is advantageous, because it allows the fraud detection capabilities of the system to be modified without the underlying software engine being changed, recompiled, tested, and validated. This,

- Reduces the time required to incorporate new fraud detection algorithms into the fraud detection engine, and hence helps to keep fraudsters in check,
- Reduces the risk of potentially serious bugs being introduced into the fraud detection engine. Since the configuration environment can be carefully controlled, it is easier to guarantee that changes to the configuration do not create serious bugs than is possible with changes to the underlying software engine, and
- Can allow non-programming personnel to configure the fraud detection engine, provided that the configuration mechanisms are suitably formulated.

The skilled address will realise that the present invention is a generalised data profiling system that can applied outside of telecommunications fraud detection described in the above examples. By providing the system with streams of measurements taken from sensors on an industrial plant, for example, it could configured to profile the plant's behavior and output alerts if critical parameters exceed predefined thresholds or the profile indicates that the plant is otherwise behaving in an undesirable way.

Modifications and variations to the present invention will be readily apparent to the skilled address from the foregoing description and appended claims. Such modifications and variations are intended to fall within the scope of the present invention.

The claims defining the invention are as follows:

1. A method of configurably profiling data comprising:
   receiving data from an input data stream;
   pre-processing the received data by performing configurable first calculations thereon to create data relating to profiling features;
   summarizing the profiling features data over a length of time, wherein the summarizing comprises i) dividing the length of time into a number of non-overlapping time-slots, ii) storing the profiling features data in one or more of the time-slots according to time information associated with or included in the profiling features data, and iii) performing configurable second calculations on the profiling feature data to create summarized data relating to profiled features; and
   post-processing the summarized profiled features data by performing configurable third calculations thereon to create a profiled output data stream for further processing.

2. A method according to claim 1, wherein the pre-processing includes receiving feedback data, which is used in the first calculations to create the data relating to profiling features, wherein the post-processing creates the feedback data from the third calculations.

3. A method according to claim 1, wherein the first calculations comprise applying a linear calculation to one or more sub-streams of the data.

4. A method according to claim 3, wherein the linear calculation does not alter the data.

5. A method according to claim 1, wherein intermediate results of the first calculations are temporarily stored for use in further first calculations.

6. A method according to claim 1, wherein each profiling feature is reconfigurably flagged as changed or unchanged to indicate whether or not the input data stream has changed from a previous input.

7. A method according to claim 1, wherein the behaviors of the profiling features data are summarized over the time-slots, and wherein the time-slots are of configurable length.

8. A method according to claim 1, wherein profiling features data independent of start and end times of events are stored in a scratch pad memory.

9. A method according to claim 1, wherein the profiling feature data is stored in one of the time-slots that corresponds with when an event that caused the profile to be updated started or ended.

10. A method according to claim 1, wherein the profiling feature data is stored in every time-slot during which the event was in progress.

11. A method according to claim 1, wherein each new instance of data falling within one of the time-slots overwrites data already in that time-slot.

12. A method according to claim 7, wherein the data in the time-slots is accumulated.

13. A method according to claim 1, wherein the time-slots are configured to wrap, such that if an update to the profiling features goes beyond the end of the (most recent) time-slot, it wraps around to the (oldest) time-slot and overwrites the data and creates an event message.

14. A method according to claim 1, wherein an event message is created when the profiler receives its first input.

15. A method according to claim 14, wherein the second calculations include using event messages to trigger specified rules.

16. A method according to claim 1, wherein event messages form part of the data relating to profiled features for post-processing.

17. A method according to claim 8, wherein the data relating to profiled features comprises information in the time-slots and scratch page memory.

18. A method according to claim 1, wherein the third calculations include identifying potential indicators of the event sought.

19. A method according to claim 1, wherein the third calculations include preparing the output data stream for further processing to identify indicators of the event sought.

20. A method according to claim 1, wherein intermediate results of the third calculations are temporarily stored for use in further third calculations.

21. A method according to claim 1, wherein each output data feature is reconfigurably flagged as changed or unchanged to indicate whether the profiled data stream has changed from a previous input or not.

22. A method according to claim 1, wherein the data is profiled to detect possible instances of fraud.

23. A method according to claim 22, wherein the method is implemented with a fraud detection system.

24. A configurable data profiling system comprising:
   a pre-processor arranged to receive an input data stream, the pre-processor also configured to perform configurable first calculations on the input data to create data relating to profiling features;

a profiler configured to summarize the profiling features data over a length of time according to configurable second calculations to create summarized data relating to profiled features, wherein the length of time is divided into a number of non-overlapping time-slots, and the profiler comprises a memory configured to store the profiling features data in one or more of the time-slots according to time information associated with or included in the profiling feature data; and a post-processor configured to perform configurable third calculations on the profiled summarized profiled features data to create profiled output data for further processing.

25. A system according to claim 24, wherein the pre-processor is arranged to receive feedback data and perform the first calculations on the input and feedback to create the data relating to profiling features, wherein the post-processor is configured to perform configurable third calculations on the profiled features data to create the feedback data and the profiled output data, wherein the system further comprises a means for providing the feedback data to the pre-processor.

26. A system according to claim 24, wherein the pre-processor is configured to apply a linear calculation to one or more sub-streams of the input and feedback data.

27. A system according to claim 24, wherein the pre-processor comprises a temporary storage for storing intermediate results of the first calculations.

28. A system according to claim 24, wherein the pre-processor comprises means for reconfigurably flagging to the profiler whether each profiling feature is as changed or unchanged.

29. A system according to claim 24, wherein the profiler comprises a memory for storing profiling features data independent of start and end times of events.

30. A system according to claim 24, wherein the plurality of non-overlapping time-slots are configured to store the summarized behaviors of the profiling features data.

31. A system according to claim 24, wherein the profiler is configured to store the summarized behaviors of the profiling features data in one of the time-slots that corresponds with when an event that caused the profile to be updated started or ended.

32. A system according to claim 24, wherein the profiler is configured to store the summarized behaviors of the profiling features data in every time-slot during which event was in progress.

33. A system according to claim 24, wherein the profiler is configured to store the summarized behaviors of the profiling features data in a time-slot by overwriting data already in that time-slot.

34. A system according to claim 24, wherein the profiler is configured to store the summarized behaviors of the profiling features data in a time-slot by accumulating a new instance of the data with data already in the time-slot.

35. A system according to claim 24, wherein the time-slots are configured to wrap, such that if an update to the profiling features goes beyond the end of the (most recent) time-slot, it wraps around to the (oldest) time-slot and overwrites the data and creates an event message.

36. A system according to claim 24, wherein the profiler is configured to create an event message when the profiler receives its first input.

37. A system according to claim 33, wherein the second calculations include using event messages to trigger specified rules, the event messages forming part of the data relating to profiled features for post-processing.

38. A system according to claim 24, the profiler is configured to pass information in the start and end time independent memory and time-slot memory to the post-processor as part of the profiled features data.

39. A system according to claim 24, wherein the post-processor is configured to perform the third calculations by identifying potential indicators of the event sought.

40. A system according to claim 24, wherein the post-processor is configured to perform the third calculations by preparing the output data stream for further processing to identify indicators of the event sought.

41. A system according to claim 24, wherein the post-processor comprises a temporary storage for storing intermediate results of the third calculations.

42. A system according to claim 24, wherein the post-processor comprises means for reconfigurably flagging in the output data stream whether each profiled feature is changed or unchanged.

43. A system according to claim 24, wherein the system is implemented with a fraud detection system.

44. A system for configurably profiling data comprising:
means for receiving data from an input data stream;
means for pre-processing the received data by performing configurable first calculations thereon to create data relating to profiling features;
means for summarizing the profiling features data over a length of time, wherein the summarizing means comprises i) means for dividing the length of time into a number of non-overlapping time-slots according to information associated with or included in profiling features data, and iii) means for performing configurable second calculations on the profiling features data to create summarized data relating to profiled features; and
means for post-processing the profiled features data by performing configurable third calculations thereon to create a profiled output data stream for further processing.

45. A method according to claim 1, wherein the output data stream is sent to a fraud detection engine for conducting fraud detection based on the output data stream and wherein the fraud detection engine comprises one or more of a rule-based engine, a scorecard, or a change-detection engine.

46. A method according to claim 1, wherein further analysis is performed on profiling features data with the time-slots to which the profiling features data is allocated.

47. A method according to claim 1, wherein the profile output data stream comprises each of the summarized profiling features data from each of the time-slots along with post-processed summarized profiling features data from each of the time-slots along with event data.

48. A method according to claim 1, wherein the summarizing processing and/or post-processing process occur only for data that has been changed.

49. A system according to claim 24, wherein feedback data is provided from the post-processor to the pre-processor.

* * * * *

UNITED STATES PATENT AND TRADEMARK OFFICE
CERTIFICATE OF CORRECTION

PATENT NO. : 7,471,780 B2
APPLICATION NO. : 10/509600
DATED : December 30, 2008
INVENTOR(S) : George Bolt and John Manslow It is certified that error appears in the above-identified patent and that said Letters Patent is hereby corrected as shown below:

At Column 6, Line 60, please delete "preprocessor" and insert therefore, --pre-processor--.

At Column 7, Line 57, please delete "feature" and insert therefore, --features--.

At Column 8, Line 33, please delete "(most recent)" and insert therefore, --most recent--.

At Column 8, Line 34, please delete "(oldest)" and insert therefore, --oldest--.

At Column 9, Line 11, please delete "feature" and insert therefore, --features--.

At Column 9, Line 13, before "summarized" please delete "profiled".

At Column 9, Line 49, before "event" please insert --the--.

At Column 9, Line 61, please delete "(most recent)" and insert therefore, --most recent--.

At Column 9, Line 62, please delete "(oldest)" and insert therefore, --oldest--.

At Column 10, Line 36, after "time-slots" please insert --, ii)means for storing the profiling features data in one or more of the time-slots--.

At Column 10, Line 37, before "information" insert --time--.

UNITED STATES PATENT AND TRADEMARK OFFICE
CERTIFICATE OF CORRECTION

PATENT NO. : 7,471,780 B2
APPLICATION NO. : 10/509600
DATED : December 30, 2008
INVENTOR(S) : George Bolt and John Manslow It is certified that error appears in the above-identified patent and that said Letters Patent is hereby corrected as shown below:

At Column 10, Line 37, after "in" insert --the--.

Signed and Sealed this

Ninth Day of June, 2009

JOHN DOLL
*Acting Director of the United States Patent and Trademark Office*